J. R. PILLOW.
TRAVELING AUTOMOBILE TURNTABLE.
APPLICATION FILED NOV. 1, 1920.

1,428,977.

Patented Sept. 12, 1922.
2 SHEETS—SHEET 1.

John R. Pillow,
INVENTOR,

BY A. L. Vencill
His ATTORNEY.

J. R. PILLOW.
TRAVELING AUTOMOBILE TURNTABLE.
APPLICATION FILED NOV. 1, 1920.
1,428,977.
Patented Sept. 12, 1922.
2 SHEETS—SHEET 2
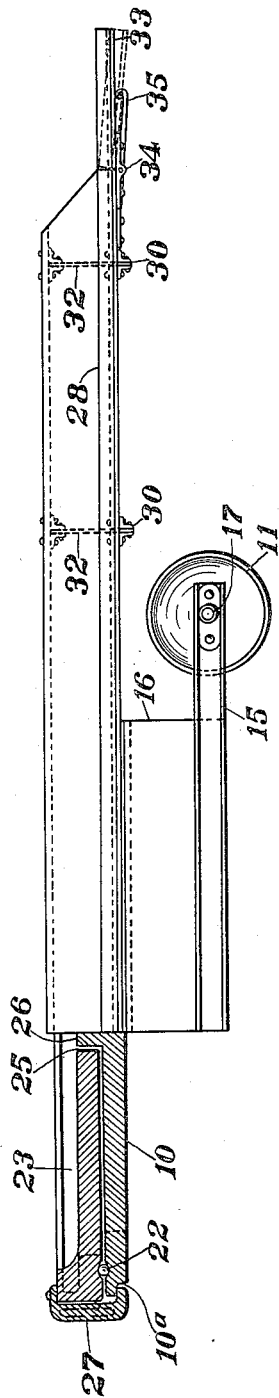
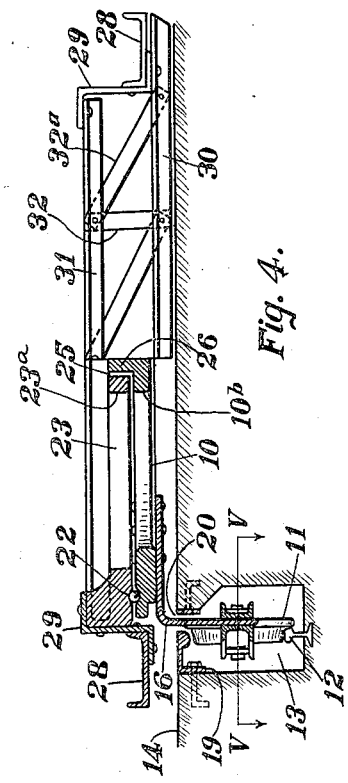
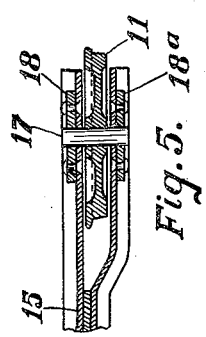
INVENTOR,
John R. Pillow,
BY
ATTORNEY Patented Sept. 12, 1922.

1,428,977

UNITED STATES PATENT OFFICE.

JOHN R. PILLOW, OF BUTLER, PENNSYLVANIA, ASSIGNOR TO A. B. COLLNER, OF CLARION, PENNSYLVANIA.

TRAVELING AUTOMOBILE TURNTABLE.

Application filed November 1, 1920. Serial No. 420,902.

*To all whom it may concern:*

Be it known that I, JOHN R. PILLOW, a citizen of the United States, residing at Butler, in the county of Butler and State of Pennsylvania, have invented certain new and useful Improvements in Traveling Automobile Turntables, of which the following is a specification.

My invention relates to traveling automobile turn tables, and particularly to turn tables of the type comprising a base provided with mobility wheels, and a turret revolubly mounted on the base and arranged to support an automobile.

One feature of my invention is the provision of parallel automobile carriers attached to the turret on opposite sides thereof and arranged to support the wheels of the automobile, so that the horizontal dimensions of the base and turret may be reduced to a minimum.

A further feature of the invention is the provision of carriers having their tread surfaces positioned below the upper surface of the turret, so that the tread surfaces will be adjacent the floor even though the body of the turret projects well above the floor.

I will describe one form of turn table embodying my invention, and will then point out the novel features thereof in claims.

Figure 1:
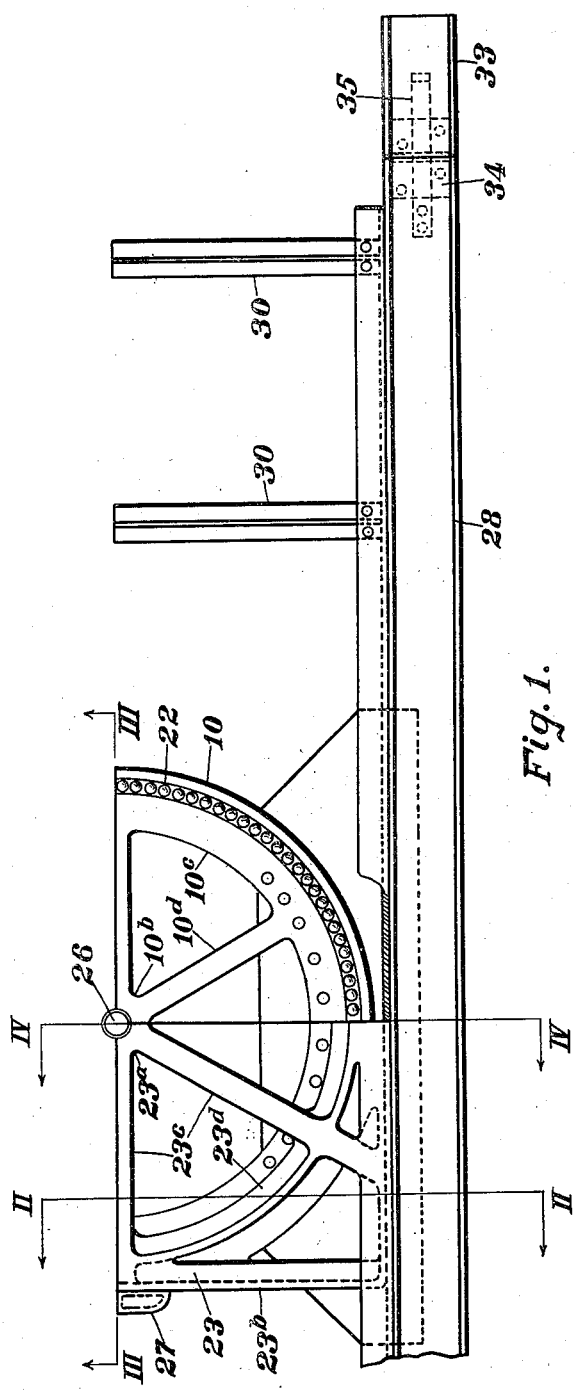
Figure 2:
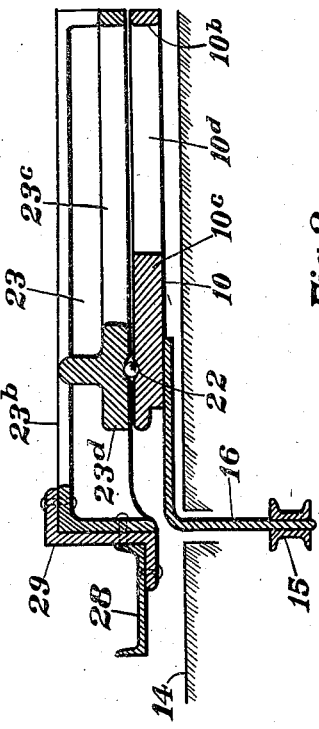

In the accompanying drawings, Fig. 1 is a top plan view showing a portion of one form of turn table embodying my invention. Fig. 2 is a transverse sectional view on the line II—II of Fig. 1. Fig. 3 is in part a side elevation of the turn table shown in Fig. 1, and in part a sectional view on the line III—III of Fig. 1. In Fig. 4, the left-hand half is a transverse sectional view on the line IV—IV of Fig. 1, and the right-hand half is an end view of the turn table. Fig. 5 is a sectional view on the line V—V of Fig. 4.

Similar reference characters refer to similar parts in each of the several views.

Referring to the drawings, the turn table comprises a base 10 provided with four mobility wheels 11 arranged to travel on a track formed by two parallel rails 12. Only one wheel and one track rail are shown in the drawings, for the reason that these drawings illustrate only somewhat more than a quarter of the turn table. As here shown, each track rail is located at the bottom of a pit 13 in the floor 14, but the wheels 11 are so disposed with respect to the base that the base itself is above the surface of the floor. To accomplish this, the wheels are mounted in longitudinal channel bars 15, which in turn are supported by angle plates 16 attached to the under surface of the base 10. Two parallel channel bars are provided for the wheels on each side, these bars being located back to back. The two bars of each pair are spread apart at each end to receive the wheels between them, and each wheel is provided with an axle 17 which is pressed into the wheel. This axle is journalled in two bearing plates 18, 18ª, one riveted to the outer surface of each channel bar, the bars being provided with holes to accommodate the axle 17.

Although I have herein shown the tracks for the mobility wheels as being located beneath the level of the floor, I do not desire to limit myself to this construction, it being understood that any desired and suitable location of these tracks falls within the scope of my invention.

In order to prevent the turn table from tilting, means are preferably provided to keep each mobility wheel 11 from rising from its track rail 12. As here shown, this is accomplished by an over-hanging rail 19 located above the pit 13, the upper surface of this rail being flush with the surface of the floor. The pit may be so formed, as shown in Fig. 4, that the opening at the floor surface is merely a slot 20 wide enough to accommodate the angle plate 16, so that this slot does not interfere with the movements of automobiles over the floor.

The upper surface of the base 10 is provided with an annular groove which forms a race-way for bearing balls 22, and these balls carry a turret 23, the under side of which is also provided with an annular ball race registering with the race-way in the base. It will be seen, therefore, that the turret is revolubly mounted on the base. To keep the turret in place on the base, the turret is provided with a central hole 25 which receives a stud 26 projecting upwardly from the center of the base.

To prevent tilting of the turret with respect to the base, I have provided two D-shaped yokes 27, one at each side of the structure and on the longitudinal center line thereof, only one of which yokes is shown in the drawings. The upper arm of each yoke is attached to the turret and the lower arm projects into a recess 10ª cut in the under surface of the base.

As here shown, the base 10 resembles a wheel in that it comprises a hub 10ᵇ, a rim 10ᶜ, and a plurality of radial spokes 10ᵈ connecting the two. On the other hand, the turret, in the form here shown, is rectangular in shape, comprising a hub 23ª, a rectangular outer frame 23ᵇ, and radial rods 23ᶜ connecting the two. The rectangular frame and the radial rods support a circular or ring-like member 23ᵈ the under surface of which rides on the bearing balls 22.

The members or carriers which directly support the wheels of an automobile are in the form of channel bars 28, one located on each side of the turrent, which bars are attached to and are fully supported by the turret. As here shown, each bar or carrier is attached to the turret by a Z-bar 29. One leg of this Z-bar rests upon and is attached to the top of the turret, and the other leg serves as a support for the corresponding channel bar 28. By virtue of this construction, it will be seen that the tread surfaces of the carriers are well below the upper surface of the turret, so that even though the turret projects considerably above the surface of the floor, these tread surfaces may still be located only a very slight distance above the floor. The carriers are spaced to correspond to the tread of a standard automobile, such as the usual pleasure car. It follows that the width of the base and of the turret is less than the tread of such an automobile.

The channel bars or carriers 28 are somewhat longer than the wheelbase of the longest automobile which is to be carried by the turn table. The two carriers are bridged at intervals by horizontal angle bars 30 located underneath the channel bars, and these angle bars are in turn suspended from other angle bars 31 which are attached to the upper horizontal legs of the Z-bars 29. As here shown, each pair of angle bars 30 is attached to the corresponding pair of bars 31 by vertical struts 32 and inclined struts 32ª. By virtue of this construction the carriers 28 are rigidly supported on the turret so that they are capable of sustaining the heaviest automobile having a wheel base not exceeding the length of the carriers.

In the form here shown, each extreme end of each carrier 28 is provided with an extension member 33 which is pivotally attached to the carrier by a hinge 34, and is normally held by a spring 35 in the position shown by the solid lines in Fig. 3. When an automobile rolls onto the carriers, these extension members swing downwardly to the floor, as indicated by the dash lines, thus providing inclined planes for the wheels of the automobile. As soon as the automobile leaves these members, however, they return to their elevated positions wherein they do not interfere with progress of the turn table along the floor or rotation of the turret. The extension members 33 may be omitted if desired.

Although I have herein shown and described only one form of turn table embodying my invention, it is understood that various changes and modifications may be made therein within the scope of the appended claims without departing from the spirit and scope of my invention.

Having thus described my invention, what I claim is:

1. A traveling automobile turn table comprising in combination, a circular base, mobility wheels carrying and fully supporting said base, a rectangular turret revolubly mounted upon said base, and automobile carriers carried by said turret and fully supported thereby.

2. A traveling automobile turn table comprising in combination, a base, mobility wheels for said base, a turret revolubly mounted upon said base, and automobile carriers carried directly by said turret, with their tread-surfaces positioned below the upper surface of said turret, and fully supported thereby.

3. A traveling automobile turn table comprising a base the width of which is less than the tread of a standard automobile, mobility wheels for said base, a turret revolubly mounted on said base and the width of which is also less than the tread of a standard automobile, and automobile carriers supported by said turret and spaced to correspond to the tread of a standard automobile.

4. A traveling automobile turn table comprising a base the width of which is less than the tread of a standard automobile, mobility wheels for said base, a turret revolubly mounted on said base and the width of which is also less than the tread of a standard automobile, and automobile carriers supported by said turret with their tread surfaces positioned below the upper surface of the turret and spaced to correspond to the tread of a standard automobile.

In testimony whereof I affix my signature.

JOHN R. PILLOW.